US009788086B2

(12) United States Patent
McGoogan et al.

(10) Patent No.: US 9,788,086 B2
(45) Date of Patent: Oct. 10, 2017

(54) MEASUREMENT SYSTEM AND METHOD FOR MEASURING A QUANTITY

(71) Applicant: AKTIEBOLAGET SKF, Göteborg (SE)

(72) Inventors: Gerard McGoogan, Philipston (GB); Frank Bartl, Neuenburg am Rhein (DE); Joseph Erskine, Falkirk (GB); Andreas Clemens Van Der Ham, Utrecht (NL)

(73) Assignee: AKTIEBOLAGET SKF, Gothenburg (SE)

( * ) Notice: Subject to any disclaimer, the term of this patent is extended or adjusted under 35 U.S.C. 154(b) by 8 days.

(21) Appl. No.: 14/760,033

(22) PCT Filed: Jan. 11, 2013

(86) PCT No.: PCT/EP2013/050515
§ 371 (c)(1),
(2) Date: Jul. 9, 2015

(87) PCT Pub. No.: WO2014/108206
PCT Pub. Date: Jul. 17, 2014

(65) Prior Publication Data
US 2015/0358695 A1    Dec. 10, 2015

(51) Int. Cl.
*G06F 1/32*        (2006.01)
*H04Q 9/00*        (2006.01)
(Continued)

(52) U.S. Cl.
CPC .............. *H04Q 9/00* (2013.01); *G01D 9/00* (2013.01); *G01D 21/00* (2013.01); *G06F 1/32* (2013.01);
(Continued)

(58) Field of Classification Search
CPC  Y02B 60/50; Y02B 60/1278; Y02B 60/1292; Y02B 60/1282; G06F 12/26;
(Continued)

(56) References Cited

U.S. PATENT DOCUMENTS 6,720,670 B2 * 4/2004 Makino ................ F03D 1/00
290/44
2006/0255907 A1 * 11/2006 Min .................... G06K 9/00013
340/5.53
(Continued)

FOREIGN PATENT DOCUMENTS

DE        10301678 A1    8/2004
DE      102007037895 A1  2/2009
DE      202011100961 U1  8/2011

OTHER PUBLICATIONS

Vijay Raghunathan et al, "Energy-Aware Wireless Miscrosenor Networks," IEEE Signal Processing Magazine, IEEE Service Center, Piscataway, NJ, US, vol. 19, No. 2, Mar. 1, 2002.

*Primary Examiner* — Benyam Haile
(74) *Attorney, Agent, or Firm* — Bryan Peckjian; SKF USA Inc. Patent Dept.

(57) ABSTRACT

A measurement system comprises a measurement unit, a transmitter, an autarkic power unit and a control unit. The measurement unit measures a quantity repeatedly and the transmitter connects the measurement system to a network and transmits data to the network based on the measurements of the measurement unit. Further, the autarkic power unit supplies electrical energy to the measurement unit, the transmitter and the control unit. Additionally, the control unit controls the measurement of the quantity and the transmission of data dynamically based on a currently available amount of energy provided by the power unit. Further, the control unit stops measurements by the measurement unit and keeps the transmitter connected to the (Continued)

network, if the currently available amount of energy is below a predefined energy limit indicating that the currently available amount of energy is too low for taking measurements and for keeping connected to the network.

7 Claims, 2 Drawing Sheets

(51) Int. Cl.
 *G01D 9/00* (2006.01)
 *G01D 21/00* (2006.01)
 *G06F 1/30* (2006.01)
 *G06F 1/26* (2006.01)
 *G06F 1/28* (2006.01)

(52) U.S. Cl.
 CPC .................. *G06F 1/26* (2013.01); *G06F 1/28* (2013.01); *G06F 1/30* (2013.01); *H04Q 2209/40* (2013.01); *H04Q 2209/886* (2013.01); *Y02B 60/1278* (2013.01); *Y02B 60/1292* (2013.01); *Y02B 60/144* (2013.01); *Y02B 60/50* (2013.01)

(58) Field of Classification Search
 CPC ........ G06F 12/28; G06F 12/30; G06F 12/305; G06F 12/32; G06F 12/3206; G06F 12/3112; G06F 12/324; G06F 12/3287; G06K 17/0022; H02J 3/14
 See application file for complete search history.

(56) References Cited

U.S. PATENT DOCUMENTS

| | | | |
|---|---|---|---|
| 2008/0264148 A1* | 10/2008 | Bulst ..................... | G01D 3/08 73/29.01 |
| 2013/0222115 A1* | 8/2013 | Davoodi ................ | H04Q 9/00 340/10.1 |
| 2014/0046494 A1* | 2/2014 | McAlister ............... | G06F 1/26 700/287 |
| 2017/0038497 A1* | 2/2017 | Hern ..................... | G01W 1/14 |

* cited by examiner

MEASUREMENT SYSTEM AND METHOD FOR MEASURING A QUANTITY

CROSS REFERENCE TO RELATED APPLICATIONS

This is a United States National Stage Application claiming the benefit of International Application Number PCT/EP2013/050515 filed on 11 Jan. 2013, which is incorporated herein by reference in its entirety.

FIELD OF THE INVENTION

Embodiments relate to the field of measured value acquisition and in particular, a measurement system and a method for measuring a quantity.

BACKGROUND

Today, the acquisition of quantities to be measured is an important task, since such measured quantities (e.g. temperature, movement or pressure) are used in a huge variety of applications for optimizing or controlling processes, for example. These measurements have to be taken often in difficultly-accessible areas, so that a self-sufficient power supply and a wireless transmission of measurement data is desired.

However, if energy is extracted from a variable speed rotating machine to power a wireless measurement system, there comes a point when the machine is rotating too slow so that not enough energy can be extracted to do a measurement, for example. This can cause the system to crash or power down. When the machine speeds up to provide enough energy to power the measurement system, the unit must spend time rebooting and connecting to the network. Similar problems occur at battery-powered devices.

Therefore, different methods have been used for such systems. For example, the power generator has been oversized to operate at low rotational speed. Alternatively, the system has large energy storage such that the system can continue to operate at lower speeds. Both options add cost and volume to the product.

Hence, there is a desire for a concept for measuring quantities with improved operating reliability and/or improved behavior during low power supply conditions.

BRIEF SUMMARY OF THE PRESENT INVENTION

Embodiments relate to a measurement system comprising a measurement unit, a transmitter, an autarkic, self sufficient, power unit and a control unit. The measurement unit is operable to measure a quantity repeatedly and the transmitter is operable to connect the measurement system to a network and to transmit data to the network based on the measurements of the measurement unit. Further, the autarkic power unit is operable to supply electrical energy to the measurement unit, the transmitter and the control unit. The control unit is operable to control the measurement of the quantity and the transmission of data dynamically based on a currently available amount of energy provided by the autarkic power unit. In this connection, the control unit is operable to stop measurements by the measurement unit and keep the transmitter connected/attached to the network, if the currently available amount of energy is below a predefined energy limit indicating that the currently available amount of energy is too low for simultaneously taking measurements and for keeping connected to the network.

The proposed measurement system may use a priorization of the different functionalities in case of low energy supplied. More precisely, the measurement system keeps the connection to the network through the transmitter rather than taking further measurements by the measurement unit. Therefore, long reboot times or reconnecting times can be avoided as long as the power supply is sufficient to maintain the connection to the network by the transmitter. In this way, the operating reliability and/or the behavior during low power supply conditions of the measurement system can be significantly improved.

In some embodiments, the control unit is operable to restart measurements by the measurement unit, if the currently available amount of energy rises above the predefined energy limit again. In this way, measurement data can be provided by the measurement system as soon as enough energy is applied by the autarkic power unit. Long reboot and/or reconnection processes can be avoided, since the connection to the network is still available.

Further embodiments relate to a measurement system with a control unit operable to reduce the number of measurements per time taken by the measurement unit, if the currently available amount of energy is below a second predefined energy limit indicating that the currently available amount of energy is too low for taking as much measurements per time as before and for keeping connected to the network. In this way, measurement data can be provided by the measurement system although the energy supply is going down, but is still sufficient to support a reduced number of measurements per time and the connection to the network at the same time. Therefore, the operating reliability and/or the behavior during low power supply conditions can be improved.

In some embodiments, the autarkic power unit comprises a power harvesting unit operable to generate electrical energy by converting kinetic energy of a rotating or vibrating machine to electrical energy, so that the currently available amount of energy depends on the rotation or vibration or the rotating or vibrating machine. Due to the power harvesting unit, the measurement system can be independent from external power supplies. However, if the rotating or vibrating machine reduces its rotation or vibration, the generated energy goes down. Due to the proposed concept, the connection to the network is kept also under low power supply conditions. Therefore, the operating reliability of a measurement system with a power supply based on an energy harvesting concept can be improved.

In some embodiments, the network is a wireless network and the transmitter is a wireless transmitter operable to establish a wireless connection to the wireless network and to transmit data to the wireless network wirelessly. Since in wireless systems, establishing a connection between a wireless transmitter and a wireless network is a time-consuming task, the operating reliability can be significantly improved by using the proposed concept.

BRIEF DESCRIPTION OF THE DRAWINGS

Some embodiments will be described in the following with reference to the accompanying Figures, in which.

DETAILED DESCRIPTION OF THE PRESENT INVENTION

Various embodiments will now be described with reference to the accompanying figures in which only some exemplary embodiments are illustrated. For the sake of clarity, individual components, lines, layers and/or regions within the figures may not be drawn to scale.

It should be understood, however, that there is no intent to limit further embodiments to the particular implementations disclosed in the following figures. To the contrary, it is pointed out that further embodiments may use alternative implementations or modifications and equivalents of the implementations disclosed in the figures which fall within the scope of the invention. In particular, the fact that individual functionalities are described with respect to different entities, functional blocks or devices shall not be construed to mean that those entities are physically separated in all possible further embodiments of the present invention. Further embodiments may also unite several functionalities in a single entity, functional block or device. Also, multiple functionalities described with respect to one single entity, functional block or device may be distributed over multiple physically separated components in further embodiments or implementations.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting further embodiments. As used herein, the singular forms "a," "an" and "the" are intended to include the plural forms as well, unless the context clearly indicates otherwise. It will be further understood that the terms "comprises", "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein shall have the same meaning as commonly understood by one of ordinary skill in the particular art. Like reference numbers refer to like or similar elements throughout the following description of the figures.

Figure 1:
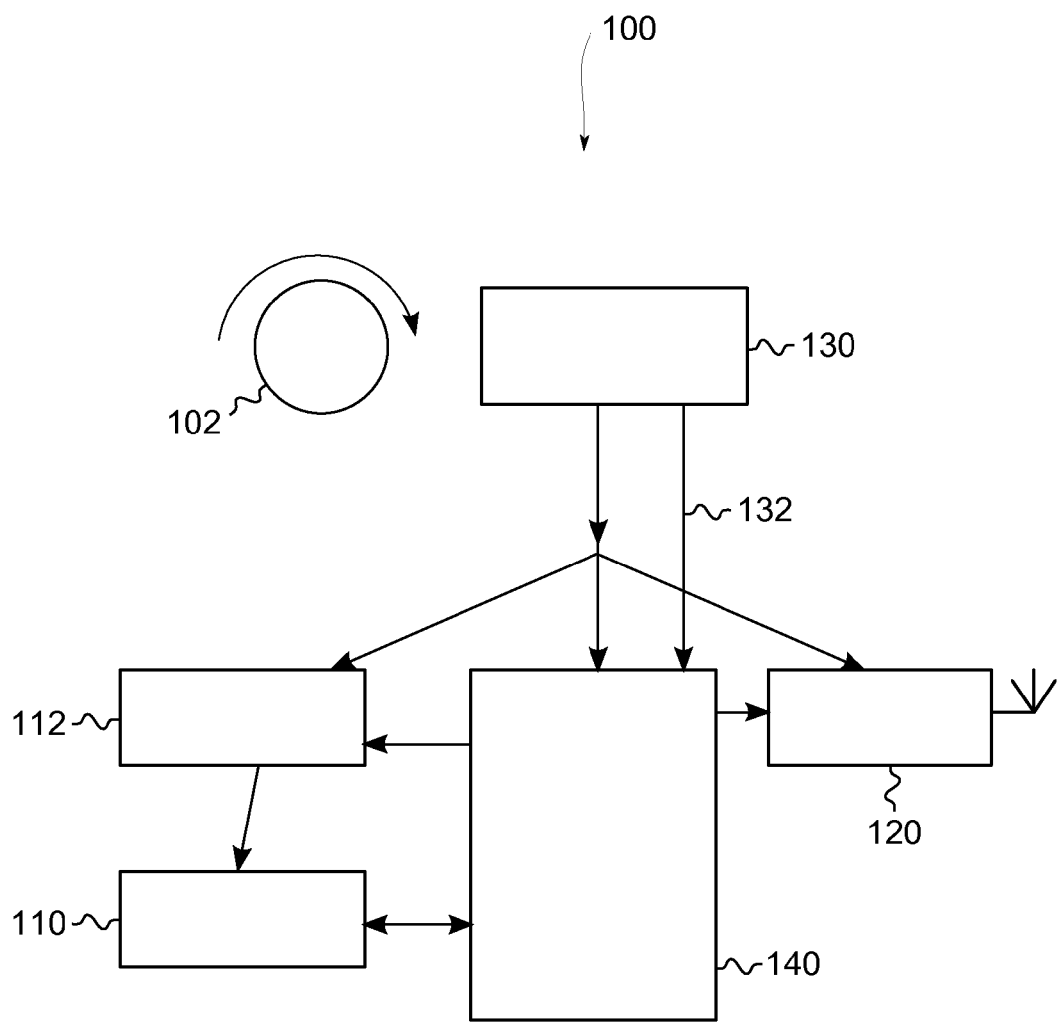
FIG. 1 shows a block diagram of a measurement system.

FIG. 1 shows a block diagram of a measurement system 100 according to an embodiment. The measurement system 100 comprises a measurement unit 110 connected to a control unit 140, a transmitter 120 connected to the control unit 140, an autarkic power unit 130 connected directly or indirectly to the measurement unit 110, to the transmitter 120 and to the control unit 140. The measurement unit 110 measures a quantity repeatedly and the transmitter 120 connects the measurement system to a network and transmits data to the network based on the measurements of the measurement unit 110. Further, the autarkic power unit 130 supplies electrical energy to the measurement unit 110, the transmitter 120 and the control unit 140. The control unit 140 controls the measurement of the quantity and the transmission of data dynamically based on a currently available amount of energy provided by the autarkic power unit 130. In this connection, the control unit 140 stops measurements by the measurement unit 110 and keeps the transmitter 120 connected to the network, if the currently available amount of energy is below a predefined energy limit indicating that the currently available amount of energy is too low for taking measurements and keeping connected to the network at the same time.

Keeping the connection to the network as long as possible can avoid long reboot or reconnect processes after losing the connection to the network. Therefore, by using the proposed concept the connection to the network can be kept even under low power supply conditions. The control unit 140 stops the measurements by the measurement unit 110 and keeps the connection to the network as long as sufficient power is supplied to keep the connection. Therefore, the operating reliability and/or the behavior during low power supply conditions of the measurement system 100 can be improved.

The proposed concept for the measurement system can be used for the measurement of an arbitrary quantity to be measured. For example, the quantity to be measured may be a temperature, a pressure, a position, a velocity, an acceleration, a force, an electric or magnetic field or another quantity. The measurement unit 110 controlled by the control unit 140 can measure the quantity to be measured repeatedly in equal, arbitrary, predefined or random time intervals.

The transmitter 120 is responsible for establishing a connection to a network for transmitting measurement data to the network. The network may be a wireless network or a wired network, so that correspondingly the transmitter 120 may be a wireless transmitter or a wired transmitter. For example, establishing a connection to the network may mean the registration of the measurement system on the network and/or the initialization of the connection to the network before data can be transmitted. This registration or initialization may not be necessary before each transmission of data, if the connection between the transmitter 120 and the network is maintained or kept alive even if no data is transmitted. In this way, the operating reliability can be improved since long rebooting or reconnecting times can be avoided. The data to be transmitted may represent the measured quantity or an information derived from the measured quantity (e.g. by the control unit), for example. The transmitter 120 may be a transmitter only or may be realized as a transceiver operable to receive data from the network. For example, control data may be received from the network. This control data may indicate which quantity should be measured and/or how many measurements per time are desired, for example.

The autarkic power unit 130 supplies electrical energy to the components of the measurement system 100. An autarkic power unit can generate the electrical energy by itself. For example, this may be done by a chemical reaction (e.g. battery) or a conversion of ambient energy (e.g. kinetic energy, thermal energy, solar power, wind energy or salinity gradients) into electrical energy. So, the autarkic power unit 130 may comprise a battery, a rechargeable battery or a power harvesting unit for converting ambient energy into electrical energy.

The control unit 140 (also called processing system) controls the measurement of the quantity and the transmission of data dynamically based on a currently available amount of energy provided by the autarkic power unit 130. A dynamic control of the measurement and the transmission means that the number of measurements per time and the transmission of data as well as the connection to the network may vary over time depending on the available amount of energy at the time, for example. Since the energy output of the autarkic power unit 130 may vary over time (e.g. depending on the available amount of ambient energy to be converted or on the charge condition of a battery) the available amount of energy may vary.

The control unit 140 controls the measurement of the quantity and the transmission of data in a way that it shuts down or stops the measurements taken by the measurement unit 110 but keeps the transmitter 120 connected to the network, if the currently available amount of energy is below a (first) predefined energy. The predefined energy limit may be set to a level that a reliable connection to the network or a minimal connectivity to the network can be maintained and on the other hand, the energy would not be sufficient for additionally taking measurements at the same time.

The control unit 140 may control the measurement unit 110 by triggering a measurement of a quantity by the measurement unit by a trigger signal provided to the measurement unit 110 or by switching on or off the power supply of the measurement unit 110, for example. For this, the measurement system 100 may comprise optionally a power switch 112 for the measurement unit 110 as it is already shown as an optional feature in FIG. 1. The power switch 112 may turn the measurement unit 110 on or off, which may be controlled by the control unit 140. Further, the control unit 140 may control the transmission of data by the transmitter 120 by triggering a transmission by a trigger signal provided to the transmitter 120 and/or providing the data to be transmitted, for example.

Optionally or additionally, the control unit 140 may restart measurements by the measurement unit 110, if the currently available amount of energy rises above the predefined energy limit. In other words, if the currently available amount of energy provided by the autarkic power unit rises (e.g. due to rising ambient energy to be converted or better charge conditions of the battery) sufficient energy may be supplied to maintain the connection to the network and restart measuring the quantity by the measurement unit 110. In this way, the time measurements cannot be taken due to low energy supply, can be reduced, so that the operating reliability can be improved.

Further optionally or alternatively, the control unit 140 can reduce the number of measurements per time taken by the measurement unit 110 without stopping the measurements, if the currently available amount of energy is below a second predefined energy limit indicating that the currently available amount of energy is too low for taking as much measurements per time as before and for keeping connected to the network at the same time. In other words, if the available amount of energy goes down, but is still enough for maintaining the connection to the network and for taking measurements from time to time, it might be a first step to reduce the number of measurements per time instead of completely stopping the measurements. If the power supply further decreases below the (first) predefined energy limit, the control unit 140 can stop the measurements. In this way, the number of measurements per time can be adjusted or adapted to the available amount of energy supplied by the autarkic power unit 130. The second predefined energy limit may be set to a value representing an amount of energy sufficient for maintaining a reliable connection to the network and taking a reduced number of measurements per time. Consequently, the second predefined energy limit is higher than the (first) predefined energy limit indicating that the currently available amount of energy is too low for taking measurements and for keeping connected to the network. In the same way, further predefined energy limits may be set so that the control unit 140 can easily adapt the number of measurements per time to the available amount of energy. In this way, an efficient exploitation of the available amount of energy can be realized.

Optionally or additionally, the control unit 140 may increase the number of measurements per time taken by the measurement unit 110, if the currently available amount of energy rises above the second predefined energy limit. In other words, if the autarkic power unit 130 is able to provide more energy again, the measurement system is able to take more measurements per time. This may help to further increase the efficient exploitation of the available amount of energy.

As already mentioned, the autarkic power unit 130 may comprise optionally a power harvesting unit for generating electrical energy by converting ambient energy into electrical energy. In this example, the currently available amount of energy depends on the available amount of ambient energy to be converted. For example, the power harvesting unit may convert kinetic energy of a rotating or vibrating machine 102 into electrical energy, so that the currently available amount of energy depends on the (speed of) rotation or vibration of the rotating or vibrating machine 102, as it is already optionally indicated in FIG. 1. For this, at least the power harvesting unit may be mounted to the rotating or vibrating machine under operating conditions. Alternatively, the whole measurement system 100 may be mounted or fixed to the rotating or vibrating machine under operating conditions. In this way, it is possible to arrange an energetic autarkic measurement system with high operating reliability directly or very close to positions, where the quantity should be measured.

Further, optionally or additionally, the autarkic power unit 130 may provide a status signal to the control unit, which indicates an information on a speed of a rotation or vibration of the rotating or vibrating machine 102. In this way, the control unit 140 can determine the currently available amount of energy. Alternatively, the control unit 140 may compare the information on the speed with a predefined speed limit indicating that the currently available amount of energy is too low for taking measurements and for keeping connected to the network at the same time resulting in stopping the measurements by the measurement unit 110 but keeping the transmitter 120 connected to the network. In other words, the control unit 140 stops the measurements by the measurement unit 110 and keeps the transmitter 120 connected to the network, if the currently available amount of energy is below a predefined energy limit, based on a status signal received from the autarkic power unit 130 indicating an information on the speed of a rotating or vibrating machine 102. Alternatively, the autarkic power unit 130 may provide a status signal to the control unit 140 indicating the currently available amount of energy or the control unit 140 may determine the currently available amount of energy based on the energy supplied to the measurement unit 110, the transmitter 120 and/or the control unit 140.

Optionally or additionally, the network is a wireless network and the transmitter 120 is a wireless transmitter operable to establish a wireless connection to the wireless network and to transmit data to the wireless network wirelessly. In this way, the autarkic measurement system can be placed or positioned nearly everywhere as long at the transmitter is able to connect to the wireless network.

A wireless transmitter with this respect may, for example correspond to one of the mobile communication systems or transceivers standardized by the 3rd Generation Partnership Project (3GPP), as Global System for Mobile Communications (GSM), Enhanced Data rates for GSM Evolution (EDGE), GSM EDGE Radio Access Network (GERAN), Universal Terrestrial Radio Access Network (UTRAN) or Evolved UTRAN (E-UTRAN), e.g. Universal Mobile Telecommunication System (UMTS), Long Term Evolution (LTE) or LTE-Advanced (LTE-A), or mobile communication systems with different standards, e.g. Multistandard Radio (MSR), Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Code Division Multiple Access (CDMA), Orthogonal Frequency Division Multiple Access (OFDMA), WirelessHART (IEC 6259) or any other technology with a multiplexing capable physical layer like Filter Bank Based Multicarrier (FBMC) systems. Of course, also short range communication systems such as Bluetooth or ZigBee may be used.

Figure 2:
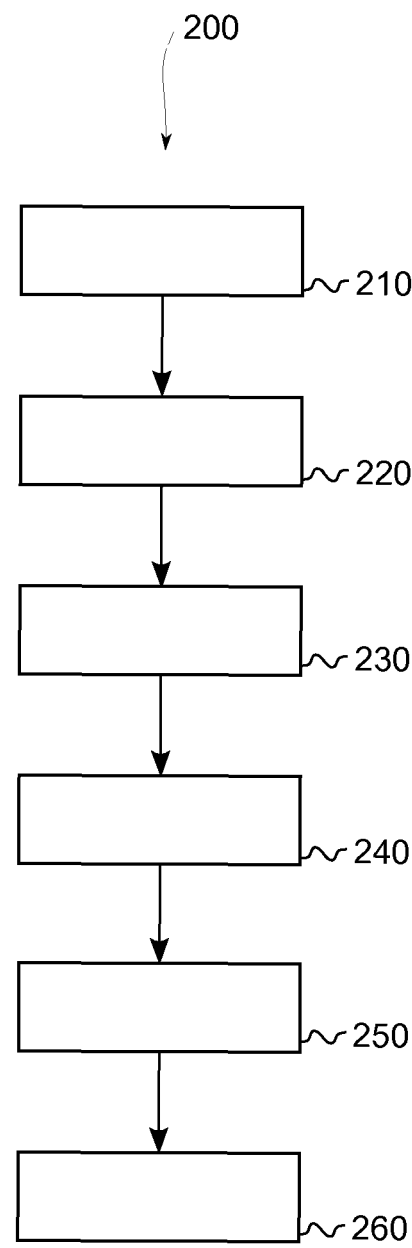
FIG. 2 shows a flowchart of a method for measuring a quantity.

FIG. 2 shows a flowchart of a method 200 for measuring a quantity according to an embodiment. The method 200 comprises measuring 210 a quantity repeatedly by a measurement unit and connecting 220 the measurement system to a network by a transmitter. Further, the method 200 comprises transmitting 230 data to the network by the transmitter based on the measurements of the measurement unit as well as supplying 240 electrical energy to the measurement unit, the transmitter and a control unit by a power unit. In addition, the method 200 comprises controlling 250 dynamically by the control unit the measurement of the quantity and the transmission of data based on a currently available amount of energy provided by the power unit and further stopping 260 measurements by the measurement unit and keeping the transmitter connected to the network, if the currently available amount of energy is below a predefined energy limit indicating that the currently available amount of energy is too low for taking measurements and keeping connected to the network.

The method 200 may comprise one or more additional, optional steps realizing one or more aspects of the concept described above.

Some embodiments relate to a computer program having a program code for performing the method described above, when the computer program is executed on a computer or processor.

Some embodiments relate to a method to cut off power-consuming circuits (e.g. AE, vibration, speed measuring, etc.), when rounds per minute (RPM) are too low to provide sufficient results. The proposed concept may be implemented in any link control protocol product (LCP product), that is any data gatherer that is powered from battery or power harvesting. Further, the suggested concept may be implemented in condition monitoring systems.

Once the system is up and running, if the rotational speed of the measuring falls below a given level, then the system may reduce the number of measurements it takes and thus saves energy. If the machine continues to slow down, the system may stop measurements altogether, until it stops taking measurements, conserving its energy to stay on the network.

This system may minimize the number of times that a wireless node may drop off the network. It can take a considerable time to rejoin a network. This may particularly be acute when a number of wireless nodes drop off the network because they are powered from the same source, for example on a train when the train slows down.

One aspect of embodiments is the combination of rotating machinery and/or power harvesting and wireless comms (wireless communications).

For example, in the embodiment shown in FIG. 1, a rotating machinery (example for rotating or vibrating machine 102) may be available. A power harvester (example for power unit 130) is arranged so that it is able to generate energy from the machine's rotation. From the power harvester, a power distribution is realized to the node's various modules (indicated by the arrows from the power unit 130 to the power switch 112, the control unit 130 and the transmitter 120). Further, a signal 132 representing the machine speed (or a signal representing when the machine is above a given speed) can be provided to the control unit 140 as indicated by the single arrow between the power unit 130 and the control unit 140. Further, a processing system (example for control unit 140), a power switch 112 that selectively powers the measurement unit 110, the measurement unit 110 and a wireless link (example for transmitter 120) is shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Functions of various elements shown in the figures, including any functional blocks (e.g. the control unit, the transmitter, the measurement unit and/or the power unit) may be provided through the use of dedicated hardware, as e.g. a processor, as well as hard-ware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective steps of these methods.

Further, it is to be understood that the disclosure of multiple steps or functions disclosed in the specification or claims may not be construed as to be within the specific order. Therefore, the disclosure of multiple steps or functions will not limit these to a particular order unless such steps or functions are not interchangeable for technical reasons. Furthermore, in some embodiments a single step may include or may be broken into multiple sub steps. Such sub steps may be included and part of the disclosure of this single step unless explicitly excluded.

REFERENCE NUMERALS

100 Measurement system
102 Rotating or vibrating machine
110 Measurement unit
112 Power switch
120 Transmitter
130 Autarkic power unit
132 Status signal
140 Control unit
200 Method for measuring a quantity
210 Measuring a quantity
220 Connecting the measurement system to a network
230 Transmitting data
240 Supplying electrical energy
250 Controlling the measurement of the quantity and the transmission of data
260 Stopping measurements and keeping the transmitter connected to the network

The invention claimed is:

1. A measurement system comprising:
a measurement unit operable to measure a quantity repeatedly;
a transmitter operable to connect the measurement system to a network and to transmit data to the network based on the measurements of the measurement unit;
an autarkic power unit operable to supply electrical energy to the measurement unit, the transmitter and a control unit; and
the control unit operable to control the measurement of the quantity and the transmission of data dynamically based on a currently available amount of energy provided by the autarkic power unit by:
reducing a number of measurements per time taken, by the measurement unit, during a first low power supply condition where the currently available amount of energy is between a first predefined energy limit and a second predefined energy limit,
stopping measurements, by the measurement unit, during a second low power supply condition where the currently available amount of energy is below the second predefined energy limit,
maintaining the connection between the transmitter and the network under the first and second low power supply conditions to avoid reboots and reconnects by the measuring device while the low power supply conditions are present, and
restarting measurements, by the measurement unit, in a condition where the currently available amount of energy rises above the first predefined energy limit,
wherein the autarkic power unit is operable to provide a status signal to the control unit, wherein the status signal indicates a machine speed of a rotating machinery,
wherein the first and second low power supply conditions comprise when the controller compares the machine speed to the first and second predefined energy limits and determines that the currently available amount of energy is below one of the first and second predefined energy limits indicating that the currently available amount of energy is too low for simultaneously taking measurements and for keeping connected to the network,
wherein the rotating machine comprises a rotating machine operable to provide kinetic energy via rotations with respect to a rotational speed,
wherein the measurement system reduces the number of measurements by the measurement unit when the rotational speed goes below a first level and the measurement system stops taking measurements by the measurement unit if the rotational speed continues to decrease below the first level to keep connected to the network.

2. The measurement system according to claim 1, wherein the autarkic power unit further comprising a power harvesting unit operable to generate electrical energy by converting ambient energy of the rotating machinery, into electrical energy, so that the currently available amount of energy depends on the machine speed, wherein the machine speed indicates an available ambient energy of the rotating machinery.

3. The measurement system according to claim 1, wherein the network is a wireless network and the transmitter is a wireless transmitter operable to establish a wireless connection to the wireless network and to transmit data to the wireless network wirelessly.

4. The measurement system according to claim 1, wherein the control unit is operable to increase the number of measurements per time taken by the measurement unit, in a condition where the currently available amount of energy rises above the second predefined energy limit.

5. The measurement system according to claim 1, with a power switch for the measurement unit operable to turn the measurement unit between an on and off state, wherein the control unit is operable to control the power switch.

6. A method for measuring a quantity, the method comprising steps of:
measuring a quantity repeatedly by a measurement unit;
connecting a measurement system to a network by a transmitter;
transmitting data to the network by the transmitter based on the measurements of the measurement unit;

supplying electrical energy to the measurement unit, the transmitter and a control unit by an autarkic power unit;

controlling dynamically by the control unit the measurement of the quantity and the transmission of data based on a currently available amount of energy provided by the autarkic power unit by:

reducing a number of measurements per time taken, by the measurement unit, during a first low power supply condition where the currently available amount of energy is between a first predefined energy limit and a second predefined energy limit, stopping measurements, by the measurement unit, during a second low power supply condition where the currently available amount of energy is below the second predefined energy limit, maintaining the connection between the transmitter and the network under the first and second low power supply conditions to avoid reboots and reconnects by the measuring device while the low power supply conditions are present, and restarting measurements, by the measurement unit, in a condition where the currently available amount of energy rises above the first predefined energy limit;

providing by the autarkic power unit a status signal to the control unit, wherein the status signal indicates a machine speed of a rotating machinery, wherein the first and second low power supply conditions comprise when the controller compares the machine speed to the first and second predefined energy limits and determines that the currently available amount of energy is below one of the first and second predefined energy limits indicating that the currently available amount of energy is too low for simultaneously taking measurements and for keeping connected to the network, wherein the rotating machine comprises a rotating machine operable to provide kinetic energy via rotations with respect to a rotational speed, wherein the measurement system reduces the number of measurements by the measurement unit when the rotational speed goes below a first level and the measurement system stops taking measurements by the measurement unit if the rotational speed continues to decrease below the first level to keep connected to the network.

7. The method according to claim 6, wherein the method is integrated into a program code of a computer program stored on a non-transitory computer or processor readable medium, wherein the computer program is executed on one of a computer or processor.

* * * * *